P. H. Inman & C. B. Withington's
Steaming & Heating Apparatus.
No. 122,723.  Patented Jan. 16, 1872.
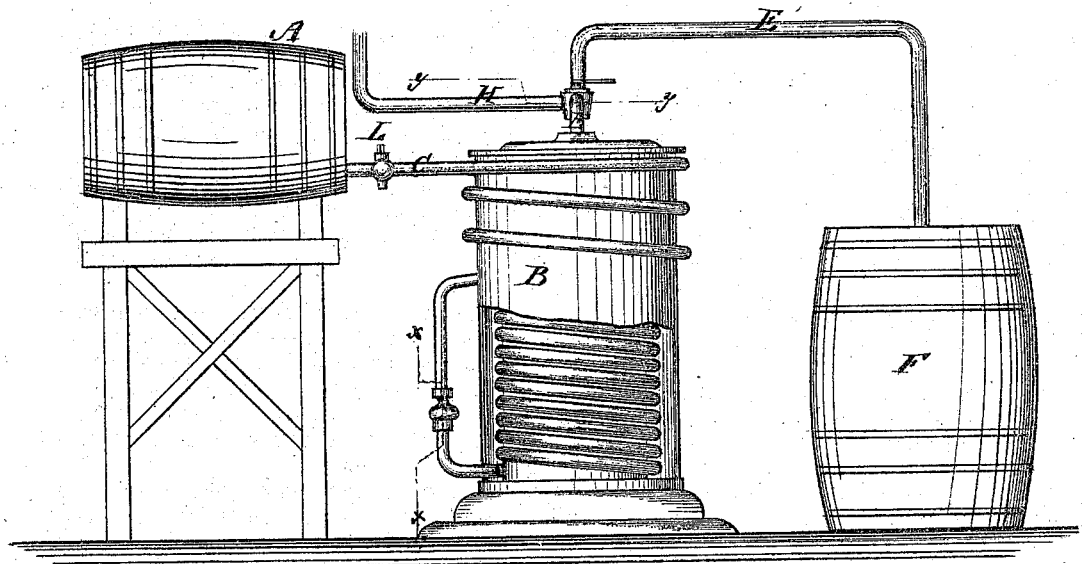
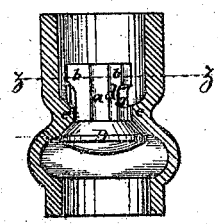
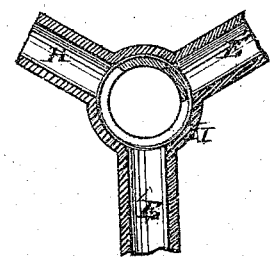
Witnesses:
Chas. Nida
Wm. H. C. Smith
Inventor:
P. H. Inman
C. B. Withington
per ——— Attorneys.

UNITED STATES PATENT OFFICE.

PETER H. INMAN AND CHARLES B. WITHINGTON, OF JANESVILLE, WISCONSIN.

IMPROVEMENT IN AGRICULTURAL-BOILERS.

Specification forming part of Letters Patent No. 122,723, dated January 16, 1872.

*To all whom it may concern:*

Be it known that we, PETER H. INMAN and CHARLES B. WITHINGTON, of Janesville, in the county of Rock and State of Wisconsin, have invented an Improved Steaming and Cooking Apparatus; and we declare the following to be a full, clear, and exact description thereof, reference being had to the accompanying drawing, in which—

Figure 1 is a side view, a part of the generator being shown in section. Fig. 2 is a cross-section on the line $y\ y$. Fig. 3 is a section in line $x\ x$; and Fig. 4 is a section in line $z\ z$, of Fig. 3.

Similar letters of reference indicate the same parts.

The object of the invention is to improve the means for preparing food for stock, so that such food can be quickly and conveniently cooked in large quantities whenever required for use. To this end the invention consists in the apparatus for applying steam, or steam and hot water combined, in the preparation of the food, as hereinafter described.

In the drawing, A is a water-reservoir, consisting of a trough, half-barrel, or other receptacle, elevated sufficiently high to enable the water to flow down through the coiled pipe C, around and in the stove B. L is a cock by which the quantity flowing can be regulated; and D is a check-valve to prevent the steam from forcing the hot water back into the reservoir.

The check-valve may be of any suitable construction, though we prefer the form represented at $a\ b\ e$, Figs. 3 and 4, as being the simplest and most durable and effective of those with which we are at present familiar.

The water, flowing at first around the outer shell of the stove, where it is warmed, passes the check-valve and enters the stove near its lower end, and thence flows up through the coils around or in the fire-pot, where it becomes very rapidly heated and is partially or wholly converted into steam. It then passes out at the top of the stove, and, when the apparatus is in use, proceeds by a pipe, E E', to the vessel F, which contains the food to be cooked. Such vessel may be made of wood, in any form preferred, a common barrel answering the purpose as well as anything. Immediately above the stove a branch pipe, H, proceeds from the pipe E out through the wall of the building, and at the junction of the two pipes H E' a three-way cock, I, is placed, being so constructed that when turned to open the branch E' it closes the branch H, and when turned to open the branch H it closes the branch E'. The steam can thus be instantaneously shut off from the cooking-vessel F, and caused to exhaust into the open air outside of the building, where it will not incommode the attendants.

All danger of accident from the over pressure of steam is also avoided, inasmuch as an escape vent, either into the cooking-vessel or to the open air, is always open, and however inexperienced or careless the attendant may be, he cannot cause an explosion of the steam-generating apparatus.

The apparatus may be employed to cook the food solely by steam by properly adjusting the cock L, so as to feed the water to the generator no faster than it can be entirely evaporated. On the other hand, by feeding the water to the generator faster than it can be turned into steam, the coil becomes filled with hot water and steam intermingled, and large quantities of the hot water blow over with the steam, and may be directed either into the vessel F or out through the escape-pipe H. The force of the steam will, ordinarily, be sufficient to raise the water considerably above the level of the stove, so that the cooking-vessel may be situated higher, if preferred.

It will be observed from the above description that the apparatus is simple and inexpensive in construction, and perfectly convenient and safe in operation.

Having thus described our invention, what we claim as new is—

The steam-cooking apparatus herein described, consisting of the reservoir A, cooking-vessel F, stove B, coil C provided with the cocks L D, pipe E, and branches E' H having a three-way cock, I, at their junction, all constructed, arranged, and operating substantially as and for the purpose described.

PETER H. INMAN.
CHAS. B. WITHINGTON.

Witnesses:
S. A. HUDSON,
HENRY PALMER.